(12) United States Patent
Zafarana et al.

(10) Patent No.: US 12,470,140 B2
(45) Date of Patent: Nov. 11, 2025

(54) VOLTAGE SCALING CURRENT LIMIT FOR MULISTAGE POWER CONVERTER

(71) Applicant: SEMICONDUCTOR COMPONENTS INDUSTRIES, LLC, Scottsdale, AZ (US)

(72) Inventors: Alessandro Zafarana, Milan (IT); Salvatore Leone, Milan (IT); Massimiliano Musazzi, Como (IT)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 198 days.

(21) Appl. No.: 18/429,284

(22) Filed: Jan. 31, 2024

(65) Prior Publication Data

US 2025/0247000 A1   Jul. 31, 2025

(51) Int. Cl.
*H02M 3/156* (2006.01)
*H02M 1/00* (2006.01)
*H02M 1/32* (2007.01)

(52) U.S. Cl.
CPC ......... *H02M 3/156* (2013.01); *H02M 1/0009* (2021.05); *H02M 1/32* (2013.01)

(58) Field of Classification Search
CPC ....... H02M 3/156; H02M 1/0009; H02M 1/32
See application file for complete search history.

(56) References Cited

U.S. PATENT DOCUMENTS

| | | | |
|---|---|---|---|
| 10,608,539 B1* | 3/2020 | Huang | H02J 1/102 |
| 2010/0199149 A1* | 8/2010 | Weingarten | G11C 11/5621 |
| | | | 711/E12.001 |
| 2017/0317488 A1 | 11/2017 | Pydah et al. | |
| 2019/0108843 A1* | 4/2019 | Atti | G10L 19/008 |
| 2020/0159579 A1* | 5/2020 | Shear | G06F 16/245 |
| 2022/0247317 A1 | 8/2022 | Jiang et al. | |
| 2024/0128853 A1* | 4/2024 | Chen | H02M 1/32 |

* cited by examiner

*Primary Examiner* — Rafael O De Leon Domenech
(74) *Attorney, Agent, or Firm* — Dickinson Wright PLLC; Jonathan A. Schnayer

(57) ABSTRACT

Systems for power conversion, and methods and controllers for operating a multistage power converter. The method includes generating a plurality of control signals to drive the multistage power converter to produce an output voltage based on a reference voltage. The method also includes determining a total current of the multistage power converter. The method further includes detecting that the total current of the multistage power converter is at or below an upper reliability threshold. The method also includes setting the reference voltage to a target operating voltage when the total current is at or below the upper reliability threshold. The method further includes detecting that the total current of the multistage power converter rises above the upper reliability threshold. The method also includes lowering the reference voltage from the target operating voltage to a lower operating voltage when the total current rises above the upper reliability threshold.

20 Claims, 5 Drawing Sheets

VOLTAGE SCALING CURRENT LIMIT FOR MULISTAGE POWER CONVERTER

BACKGROUND

Buck converters are widely used for middle-power applications. The buck topology offers several advantages. However, single-stage variants of the buck topology can be challenging for higher-power applications (for example, server power supplies, high current charger, etc.). Consequently, multistage variants of the buck topology are used for the design of higher-power applications. A large output filter capacitance is required in high-power applications to achieve a low voltage ripple. The filter capacitance of a buck converter can be significantly reduced by interleaving. Interleaving means all stages have same switching frequency and appropriate phase shift between them (for example, the phase shift is 180° for two stages and the phase shift is 120° for three stages).

SUMMARY

In the computing market, a large number of processing units work together to increase computational capability, so the demand of power increases until the demand reaches the thermal limit of the platform. When insufficient temperature margin is available, the processing units may attempt to draw additional power using dynamic voltage scaling based on scaling the system clock. High computational demand on a processing unit can cause a load current for an associated multistage power converter to exceed a thermal limit of the system. Thus, the present disclosure provides systems for power conversion, and controllers and methods for operating multistage power converters that keep load current constant at a maximum current threshold by lowering output voltage.

The present disclosure provides a method for operating a multistage power converter. The method includes generating a plurality of control signals to drive the multistage power converter to produce an output voltage based on a reference voltage. The method also includes determining a total current of the multistage power converter. The method further includes detecting that the total current of the multistage power converter is at or below an upper reliability threshold. The method also includes setting the reference voltage to a target operating voltage when the total current is at or below the upper reliability threshold. The method further includes detecting that the total current of the multistage power converter rises above the upper reliability threshold. The method also includes lowering the reference voltage from the target operating voltage to a lower operating voltage when the total current rises above the upper reliability threshold.

The present disclosure also provides a controller for operating a multistage power converter. The controller includes, in one implementation, a multistage regulator and a voltage controller. The multistage regulator is configured to generate a plurality of control signals to drive the multistage power converter to produce an output voltage based on a reference voltage. The voltage controller is configured to generate a set voltage. The voltage controller is also configured to determine a total current of the multistage power converter. The voltage controller is further configured to compare the total current of the multistage power converter to an upper reliability threshold. The voltage controller is also configured to set the set voltage to a target operating voltage when the total current of the multistage power converter is at or below the upper reliability threshold. The voltage controller is further configured to set the set voltage to a lower operating voltage when the total current of the multistage power converter is above the upper reliability threshold. The multistage regulator is further configured to adjust the reference voltage to match the set voltage.

The present disclosure further provides a system for power conversion. The system includes, in one implementation, a multistage power converter and a controller. The multistage power converter includes a plurality of stages. The controller is configured to generate a plurality of control signals to drive the plurality of stages to produce an output voltage based on a reference voltage. The controller is also configured to determine a total current of the multistage power converter. The controller is further configured to compare the total current of the multistage power converter to an upper reliability threshold. The controller is also configured to set the reference voltage to a target operating voltage when the total current of the multistage power converter is at or below the upper reliability threshold. The controller is further configured to set the reference voltage to a lower operating voltage when the total current of the multistage power converter is above the upper reliability threshold.

BRIEF DESCRIPTION OF THE DRAWINGS

For a detailed description of example implementations, reference will now be made to the accompanying drawings in which.

DEFINITIONS

Figure 1:
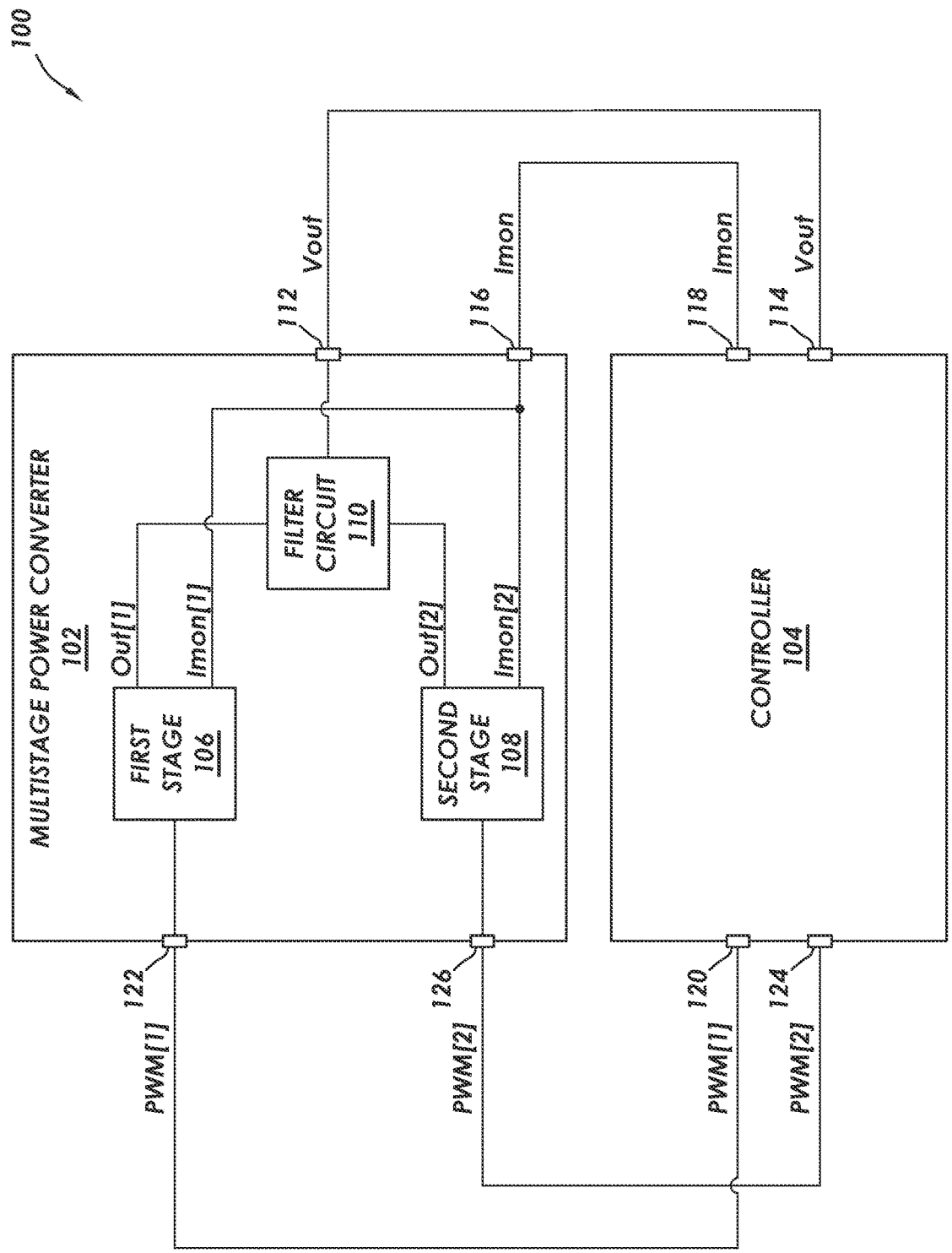
FIG. 1 is a block diagram of an example of a system for power conversion in accordance with some implementations.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices, whether stand alone or as part of an integrated circuit, the terms "input" and "output" refer to electrical connections to the electrical devices, and shall not be read as verbs requiring action. For example, a differential amplifier, such as an operational amplifier, may have a first differential input and a second differential input, and these "inputs" define electrical connections to the operational amplifier, and shall not be read to require inputting signals to the operational amplifier.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), one or more microcontrollers with controlling software, a reduced-instruction-set computer (RISC) with controlling software, a digital signal processor (DSP), one or more processors with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to multistage power converters that implement voltage scaling current limits. More particularly, at least some examples are directed to multistage power converters and related controllers that keep high load currents constant at a maximum current threshold by lowering output voltage. Multistage power converters can be used to regulate voltage of a complex digital system on a chip (SoC) that embeds a power unit to implement dynamic voltage and frequency scaling. Dynamic voltage and frequency scaling is a control system to optimize SoC power consumption by acting dynamically on voltage supply and clock frequency. The specification now turns to an example system to orient the reader.

FIG. 1 is a block diagram of an example of a system 100 for power conversion in accordance with some implementations. The system 100 illustrated in FIG. 1 includes a multistage power converter 102 and a controller 104. The multistage power converter 102 illustrated in FIG. 1 includes a first stage 106, a second stage 108, and a filter circuit 110. The methods described herein may be used with systems having fewer, additional, or different components in different configurations than the system 100 illustrated in FIG. 1. For example, the multistage power converter 102 may include more than two stages. In some implementations, the multistage power converter 102 and the controller 104 are separate components (as illustrated in FIG. 1). In alternate implementations, the multistage power converter 102 and the controller 104 may be part of the same component. For example, the multistage power converter 102 and the controller 104 may both be positioned on a single printed circuit board and/or within a single chip housing.

The multistage power converter 102 is configured to produce an output voltage Vout. The multistage power converter 102 includes a first output terminal 112 which provides the output voltage Vout to a first input terminal 114 of the controller 104. The multistage power converter 102 also includes a second output terminal 116 which provides a total current monitoring signal Imon to a second input terminal 118 of the controller 104. The total current monitoring signal Imon is the combination of a first current monitoring signal Imon[1] (representing the primary current of the first stage 106) and a second current monitoring signal Imon[2] (representing the primary current of the second stage 108). As explained in more detail below, the controller 104 generates a first control signal PWM[1] to control the first stage 106 and a second control signal PWM[2] to control the second stage 108. The first control signal PWM[1] and the second control signal PWM[2] are pulse-width modulation (PWM) signals. Also, as explained in more detail below, the controller 104 generates the first control signal PWM[1] and the second control signal PWM[2] based on, for example, the output voltage Vout and the total current monitoring signal Imon. The controller 104 includes a third output terminal 120 to provide the first control signal PWM[1] to a third input terminal 122 of the multistage power converter 102. The third input terminal 122 is coupled to the first stage 106. The controller 104 also includes a fourth output terminal 124 to provide the second control signal PWM[2] to a fourth input terminal 126 of the multistage power converter 102. The fourth input terminal 126 is coupled to the second stage 108. The first stage 106 generates a first output signal Out[1], as will be described below in more detail. The second stage 108 generates a second output signal Out[2]. The filter circuit 110 combines and filters to the first output signal Out[1] and the second output signal Out[2] to generate the output voltage Vout. In some implementations, the filter circuit 110 includes inductors for each of the first output signal Out[1] and the second output signal Out[2] that operate with a capacitor to reduce voltage ripple. The specification now turns to a description of example components included in the first stage 106. The second stage 108 may include components similar to ones described below in relation the first stage 106.

Figure 2:
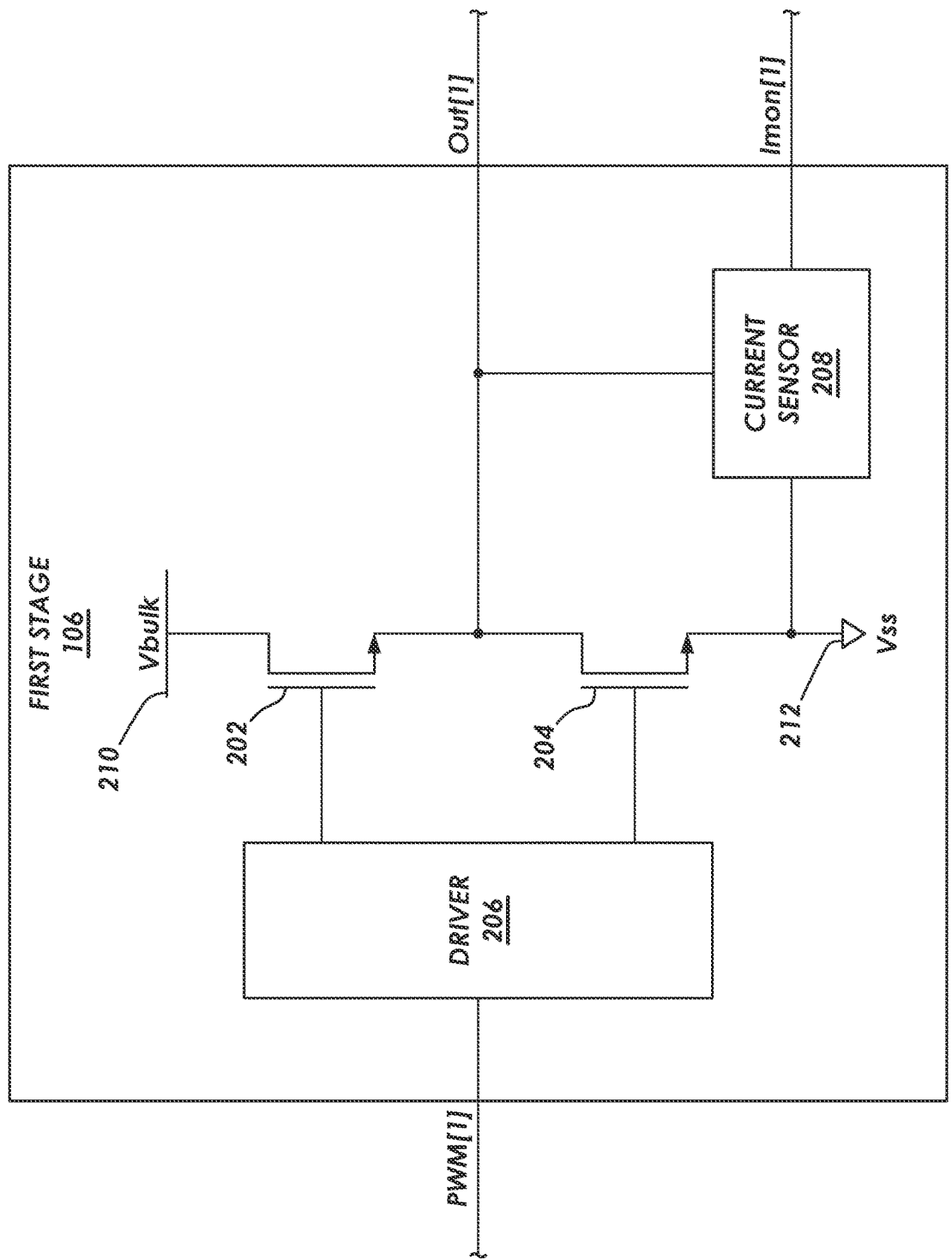
FIG. 2 is a partial schematic and a partial block diagram of an example of a first stage of a multistage power converter in accordance with some implementations.

FIG. 2 is a partial schematic and a partial block diagram of an example of the first stage 106 in accordance with some implementations. The first stage 106 illustrated in FIG. 2 includes a first transistor 202, a second transistor 204, a driver 206, and a current sensor 208. The first transistor 202 and the second transistor 204 are coupled in a series configuration between a positive power supply terminal 210 and a ground power supply terminal 212. An input voltage Vbulk is supplied at the positive power supply terminal 210 and a reference voltage Vss is supplied at the ground power supply terminal 212. The first transistor 202 and the second transistor 204 are illustrated in FIG. 2 as metal-oxide-semiconductor field-effect transistors (MOSFETs), and in particular, N-channel MOSFETs. However, other types of FETs may be used (for example, P-channel MOSFETs), and in fact other types of transistors may also be used (for example, bi-polar junction transistors). The gate terminals of the first transistor 202 and the second transistor 204 are coupled to the driver 206 to receive a pair of complementary signals. The pair of complementary signals are two Boolean signals that are logic inverted. For example, one complementary signal is asserted high when the other complementary signal is asserted low. The driver 206 is configured to generate the pair of complementary signals to drive the first transistor 202 and the second transistor 204 to generate the first output signal Out[1]. The driver 206 generates the pair of complementary signals based on the first control signal PWM[1]. For example, when the first control signal PWM[1] is set to a high value, the driver 206 may generate the pair of complementary signals to turn on the first transistor 202 and turn off the second transistor 204. Further, when the first control signal PWM[1] is set to a low value, the driver 206 may generate the pair of complementary signals to turn off the first transistor 202 and turn on the second transistor 204. In some implementations, when the first control signal PWM[1] is set to a mid-level value, the driver 206 generates the pair of complementary signals to turn off both the first transistor 202 and the second transistor 204. The current sensor 208 is configured to generate the first current monitoring signal Imon[1]. As described above, the second stage 108 may include components similar to ones described above in relation to the first stage 106. Thus, for brevity, a separate description of example components included in the second stage 108 is not included. The specification now turns to a description of example components included in the controller 104.

Figure 3:
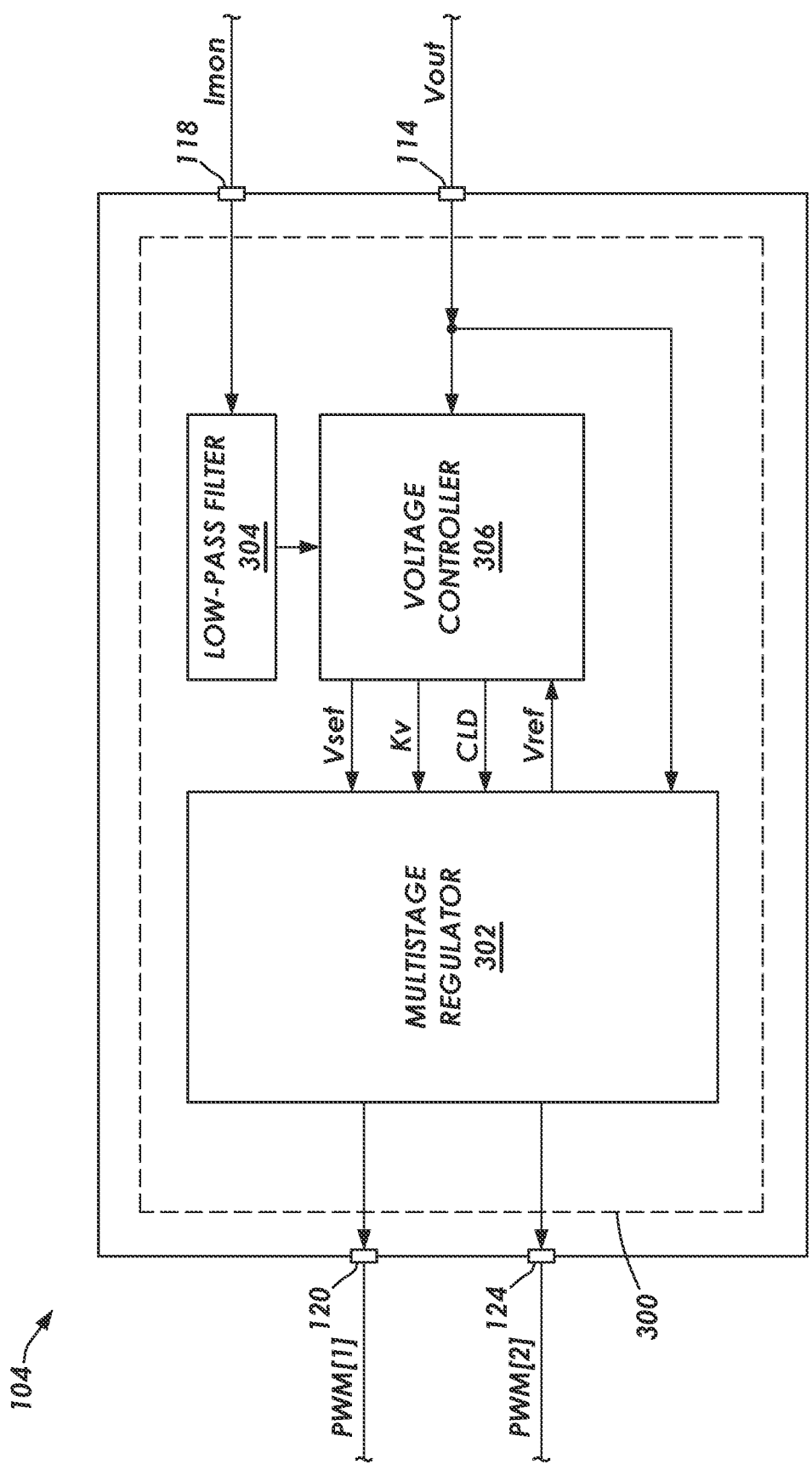
FIG. 3 is a block diagram of an example of a controller for a multistage power converter in accordance with some implementations.

FIG. 3 is a block diagram of an example of the controller 104 in accordance with some implementations. In particular, the controller 104 may comprise electrical devices and circuits monolithically created on a substrate 300 and encapsulated within packaging; however, the functionality of various components may be embodied on multiple substrates that are co-packaged (for example, multi-chip module) and electrically coupled to each other and coupled to the various terminals. The controller 104 illustrated in FIG. 3 includes a multistage regulator 302, a low-pass filter 304, and a voltage controller 306. The controller 104 illustrated in FIG. 3 also includes the first input terminal 114, the second input terminal 118, the third output terminal 120, and the fourth output terminal 124. The example terminals are electrical connections exposed and accessible through the packaging. Additional terminals will be present (for example, power terminal, reference voltage terminal, ground terminal), but those additional terminals are not shown so as not to unduly complicate the figure. The controller 104 may include fewer components, more components, or different components in different configurations than the controller 104 illustrated in FIG. 3.

The multistage regulator 302 illustrated in FIG. 3 is configured to perform dynamic voltage scaling. However, in alternate implementations, the controller 104 may include a separate component (not shown) that performs dynamic voltage scaling. The multistage regulator 302 illustrated in FIG. 3 is coupled to the voltage controller 306 to receive a set voltage Vset, a voltage slope Kv, and a current limit disable signal CLD therefrom. The multistage regulator 302 determines (for example, modulates) a reference voltage Vref that follows the set voltage Vset using the voltage slope Kv. The voltage slope Kv is the rate at which the multistage regulator 302 increases or decreases the reference voltage Vref to match the set voltage Vset. For example, when the set voltage Vset changes from 0.5 Volts to 0.8 Volts and the voltage slope Kv is 5 microvolts per microsecond, the multistage regulator 302 may increase the reference voltage Vref in 5 microvolt steps from 0.5 Volts up to 0.8 Volts. As a further example, when the set voltage Vset changes from 0.8 Volts to 0.5 Volts and the voltage slope Kv is 20 microvolts per microsecond, the multistage regulator 302 may decrease the reference voltage Vref in 20 microvolt steps from 0.8 Volts down to 0.5 Volts. In this manner, the multistage regulator 302 acts as an integrator for the set voltage Vset.

The multistage regulator 302 illustrated in FIG. 3 is coupled to the third output terminal 120 to provide the first control signal PWM[1] to the first stage 106 of the multistage power converter 102. The multistage regulator 302 illustrated in FIG. 3 is also coupled to the fourth output terminal 124 to provide the second control signal PWM[2] to the second stage 108 of the multistage power converter 102. The multistage regulator 302 illustrated in FIG. 3 is also coupled to the first input terminal 114 to receive the output voltage Vout from the multistage power converter 102. The multistage regulator 302 generates the first control signal PWM[1] and the second control signal PWM[2] in order to control the multistage power converter 102 to produce the output voltage Vout at a voltage level that matches the reference voltage Vref. For example, when the output voltage Vout is 0.5 Volts and the reference voltage Vref is 0.8 Volts, the multistage regulator 302 may adjust the first control signal PWM[1] and the second control signal PWM[2] so that the output voltage Vout of the multistage power converter 102 increases to 0.8 Volts.

In some implementations, the multistage regulator 302 also generates the first control signal PWM[1] and the second control signal PWM[2] in order to individually limit the current of the first stage 106 or the second stage 108. For example, the multistage regulator 302 may generate the first control signal PWM[1] to limit the current of the first stage 106 based on the first current monitoring signal Imon[1]. In such implementations, the multistage regulator 302 is coupled to the first stage 106 and the second stage 108 to receive the first current monitoring signal Imon[1] and the second current monitoring signal Imon[2], respectively. Limiting the current of the first stage 106 or the second stage 108 may cause the output voltage Vout of the multistage power converter 102 to drop below a lower operating threshold of a load device (not shown) coupled to the output of the multistage power converter 102 (for example, coupled to the first output terminal 112). Thus, in such implementations, the multistage regulator 302 is configured to disable the current limit on each stage of the multistage power converter 102 when the multistage regulator 302 receives a current limit disable signal CLD from the voltage controller 306. As will be described in more detail below, the voltage controller 306 generates a current limit disable signal CLD when the output voltage Vout of the multistage power converter 102 is at or below a predetermined lower operating threshold.

The low-pass filter 304 illustrated in FIG. 3 is coupled to the second input terminal 118 to receive the total current monitoring signal Imon. The voltage controller 306 illustrated in FIG. 3 is coupled to the low-pass filter 304 to receive a filtered version of the total current monitoring signal Imon therefrom. The voltage controller 306 illustrated in FIG. 3 is also coupled to the first input terminal 114 to receive the output voltage Vout of the multistage power converter 102. The voltage controller 306 illustrated in FIG. 3 is also coupled to the multistage regulator 302 to provide the set voltage Vset and the voltage slope Kv thereto and to receive the reference voltage Vref therefrom. Under normal operation, the voltage controller 306 sets the set voltage Vset to a target operating voltage. The target operating voltage may be determined based on a load device coupled to the output of the multistage power converter 102. For example, the target operating voltage may be set to 0.8 Volts for a load device with a specified operating range of 0.4 Volts to 1.2 Volts. When the total current of the multistage power converter 102 rises above an upper reliability threshold of the multistage power converter 102, the voltage controller 306 is configured to keep the total current of multistage power converter 102 constant at the upper reliability threshold by lowering the set voltage Vset from the target operating voltage to a lower operating voltage of the multistage power converter 102. The upper reliability threshold is highest level of current at which the multistage power converter 102 will reliably operate. The lower operating voltage is an intermediate operating voltage at which the multistage power converter 102 and a connected load device will operate to still deliver current at the upper reliability threshold. The lower operating voltage may be determined based on, for example, the load current (i.e., the load current level before a sudden load increase event occurs). For example, the lower operating voltage may be determined based on Equation 1 below:

$$V_{min} = (I_{knee} - I_b)/G_{cpu} \qquad \text{Equation 1}$$

where:
 $V_{min}$=lower operating voltage;
 $I_{knee}$=upper reliability threshold;
 $I_b$=load current; and
 $G_{cpu}$=dynamic current driven by dynamic voltage frequency scaling.

The upper reliability threshold, the load current, and the dynamic current driven by dynamic voltage frequency scaling are fixed, known parameters of the multistage power converter 102. In some situations, the lower operating voltage determined by Equation 1 may be below the specified operating range of a load device coupled to the output of the multistage power converter 102. In such situations, the voltage controller 306 may set the lower operating voltage to (or slightly above) the lowest voltage in the specified operating range of the load device. For example, the voltage controller 306 may set the lower operating voltage to 0.5 when the lower operating voltage determined by Equation 1 is 0.4 Volts and the specified operating range of the load device is 0.5 Volts to 1.1 Volts.

The voltage controller 306 is configured to compare the total current of the multistage power converter 102 to the upper reliability threshold and set the set voltage Vset to the target operating voltage or the lower operating voltage based on the result of the comparison. For example, when the total current of the multistage power converter 102 is at or below the upper reliability threshold, the voltage controller 306 may set the set voltage Vset to the target operating voltage. Alternatively, when the total current of the multistage power converter 102 rises above the upper reliability threshold, the voltage controller 306 may set the set voltage Vset to the lower operating voltage. To prevent the voltage controller 306 from erroneously lowering the set voltage Vset in response to short-term current fluctuations, the low-pass filter 304 filters the total current monitoring signal Imon (an example of an "unfiltered current signal").

The voltage controller 306 is configured to set the voltage slope Kv based on the reference voltage Vref. For example, when the reference voltage Vref is at or above the target operating voltage, the voltage controller 306 may set the voltage slope Kv to a small value (for example, about 5 millivolts per microsecond). Alternatively, when the reference voltage Vref is below the target operating voltage, the voltage controller 306 may set the voltage slope Kv to a large value (for example, about 20 millivolts per microsecond).

In the manner described above, the controller 104 implements a gain loop. For example, the controller 104 may implement a gain loop determined based on Equation 2 below:

$$G_{loop} = G_{LPF} \times K_v \times (G_{cpu}/s) \qquad \text{Equation 2}$$

where:
 $G_{loop}$=gain loop of the controller 104;
 $G_{LPF}$=gain of the low-pass filter 304;
 $K_v$=voltage slope;
 $G_{cpu}$=dynamic current driven by dynamic voltage frequency scaling; and
 s=transfer function of integration.

The gain of the low-pass filter 304 and the dynamic current driven by dynamic voltage frequency scaling are fixed, known parameters. Further, the voltage slope Kv is set by the voltage controller 306 as described above. The gain loop of the controller 104 is stable as long as the voltage slope Kv is moderate and the cutoff-frequency of the low-pass filter 304 is high.

As described above, the multistage regulator 302 is configured to disable the current limit on each stage of the multistage power converter 102 when the voltage controller 306 generates a current limit disable signal CLD. The voltage controller 306 is configured to generate a current limit disable signal CLD when the output voltage Vout of the multistage power converter 102 is at or below a predetermined lower operating threshold. As described above, the voltage controller 306 illustrated in FIG. 3 is coupled to the first input terminal 114 to receive the output voltage Vout of the multistage power converter 102. The voltage controller 306 may compare the output voltage Vout of the multistage power converter 102 (received via the first input terminal 114) to the lower operating threshold in order to determine when to generate a current limit disable signal CLD.

Figure 4:
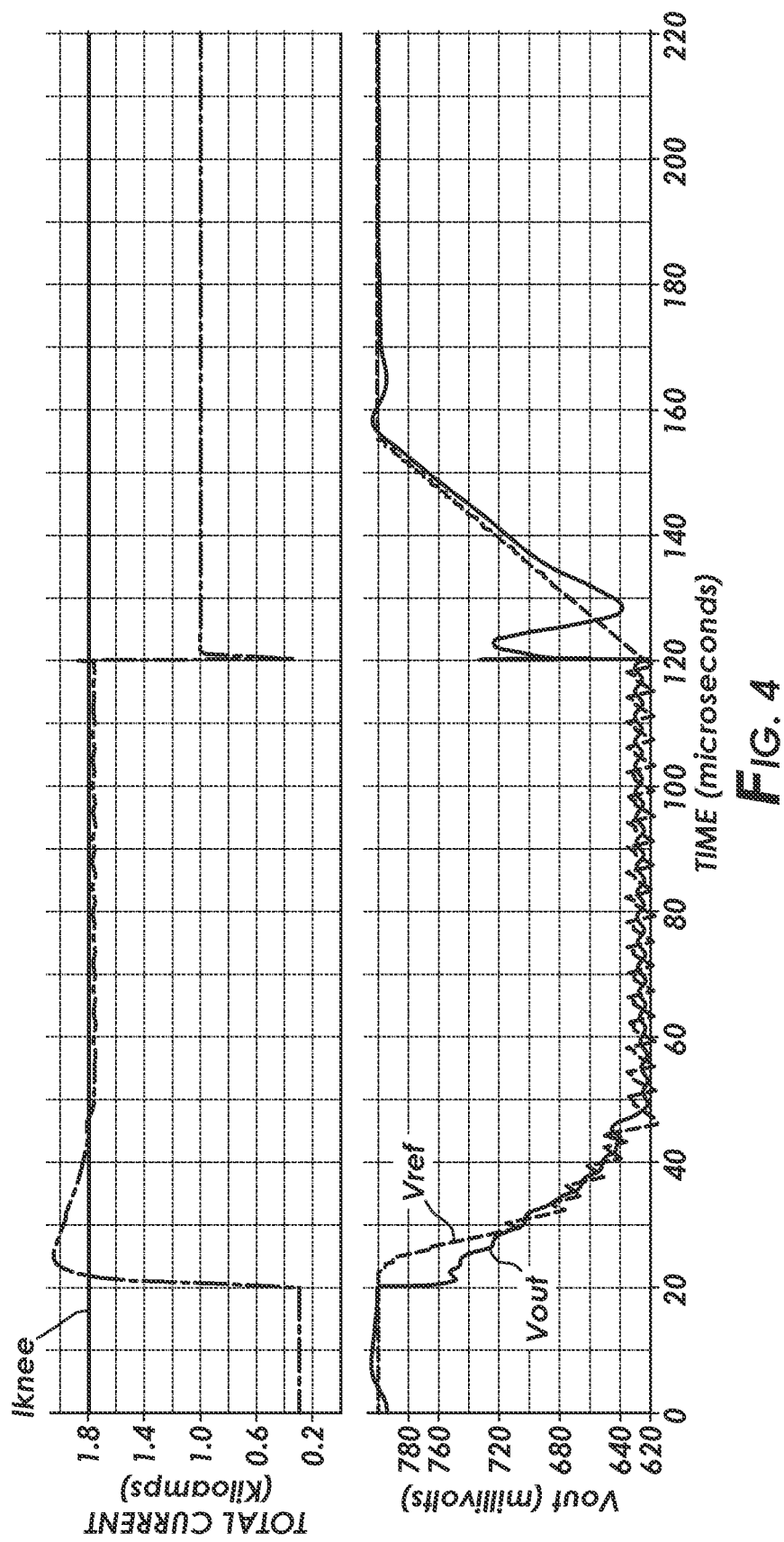
FIG. 4 is an example of a response plot of a multistage power converter in accordance with some implementations.

FIG. 4 is an example of a response plot of the multistage power converter 102. As illustrated in FIG. 4, when the total current of the multistage power converter 102 rises above the upper reliability threshold of 1.85 kiloamps at about 20 microseconds, the controller 104 lowers the reference voltage Vref from a target operating voltage of 800 millivolts to a lower operating voltage of 620 millivolts. As illustrated in FIG. 4, lowering the reference voltage Vref keeps the total current of the multistage power converter 102 constant at the upper reliability threshold. The controller 104 keeps the reference voltage Vref at the lower operating voltage until the total current of the multistage power converter 102 drops below the upper reliability threshold at about 120 microseconds. After the total current of the multistage power converter 102 drops below the upper reliability threshold, the reference voltage Vref is raised from the lower operating voltage of 620 millivolts back to the target operating voltage of 800 millivolts.

Figure 5:
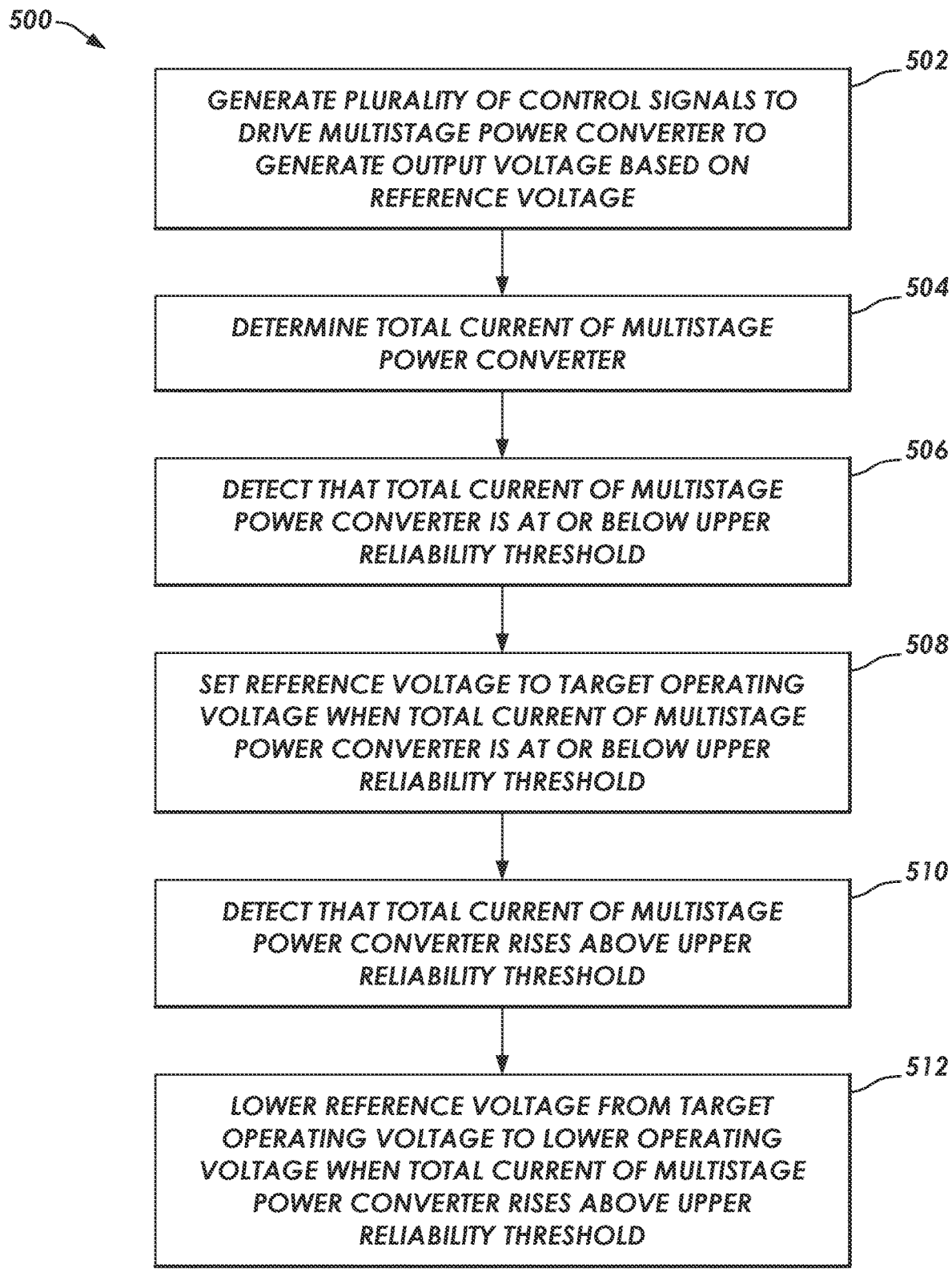
FIG. 5 is a flow diagram of an example of a method for operating a multistage power converter in accordance with some implementations.

FIG. 5 is a flow diagram of an example of a method 500 for operating the multistage power converter 102 in accordance with some implementations. For simplicity of explanation, the method 500 is depicted in FIG. 5 and described as a series of operations. However, the operations can occur in various orders and/or concurrently, and/or with other operations not presented and described herein. At block 502, a plurality of the control signals are generated to drive the multistage power converter 102 to generate the output voltage Vout based on the reference voltage Vref. For example, the multistage regulator 302 may generate the first control signal PWM[1] and the second control signal PWM[2] to drive the first stage 106 and the second stage 108, respectively, to produce an output voltage Vout that matches the reference voltage Vref.

At block 504, the total current of the multistage power converter 102 is determined. In some implementations, the total current of the multistage power converter 102 is determined by the multistage power converter 102 (or by the controller 104) combining the first current monitoring signal Imon[1] and the second current monitoring signal Imon[2] to generate the total current monitoring signal Imon. Alternatively, or in addition, the total current of the multistage power converter 102 is determined by the controller 104 receiving the total current monitoring signal Imon from the multistage power converter 102. Alternatively, or in addition, the total current of the multistage power converter 102 is determined by the controller 104 filtering the total current monitoring signal Imon with the low-pass filter 304.

At block 506, the total current of the multistage power converter 102 is detected as being at or below an upper reliability threshold. For example, the voltage controller 306 may detect that the total current of the multistage power converter 102 is equal to or lower than the upper reliability threshold. At block 508, the reference voltage Vref is set to the target operating voltage when the total current of the multistage power converter 102 is at or below the upper reliability threshold. For example, the voltage controller 306 may set the set voltage Vset to the target operating voltage.

At block 510, the total current of the multistage power converter 102 is detected as rising above the upper reliability threshold. For example, the voltage controller 306 may detect that the total current of the multistage power converter 102 is greater than the upper reliability threshold. At block 512, the reference voltage is lowered from the target operating voltage to the lower operating voltage when the total current of the multistage power converter 102 rises above the upper reliability threshold. For example, the voltage controller 306 may set the set voltage Vset to the lower operating voltage. In some implementations, the multistage regulator 302 may decrease the reference voltage Vref at a first voltage slope until the reference voltage is at the lower operating voltage. For example, when the first voltage slope is 20 microvolts per microsecond, the multistage regulator 302 may decrease the reference voltage Vref in 20 microvolt steps until the reference voltage Vref is at the lower operating voltage.

In some implementations, when the total current of the multistage power converter 102 falls below the upper reliability threshold after block 512, the reference voltage Vref may be increased from the lower operating voltage to the target operating voltage. For example, the voltage controller 306 may detect that the total current of the multistage power converter 102 falls below the upper reliability threshold. Responsive to detecting that the total current of the multistage power converter 102 falls below the upper reliability threshold, the voltage controller 306 may set the set voltage Vset to the target operating voltage. In some implementations, the multistage regulator 302 may increase the reference voltage Vref at a second voltage slope until the reference voltage Vref is at the target operating voltage. For example, when the second voltage slope is 5 microvolts per microsecond, the multistage regulator 302 may increase the reference voltage Vref in 5 microvolt steps until the reference voltage Vref is at the target operating voltage. In some implementations, the second voltage slope is less than the first voltage slope as in the examples described above. For example, the multistage regulator 302 may be configured to increase the reference voltage Vref in smaller steps than when the multistage regulator 302 decreases the reference voltage Vref. In alternate implementations, the second voltage slope may be equal to the first voltage slope. For example, the multistage regulator 302 may be configured to increase and decrease the reference voltage Vref with the same size steps.

Consistent with the above disclosure, the examples of systems and methods enumerated in the following clauses are specifically contemplated and are intended as a non-limiting set of examples.

Clause 1. A method for operating a multistage power converter, the method comprising:
  generating a plurality of control signals to drive the multistage power converter to produce an output voltage based on a reference voltage;
  determining a total current of the multistage power converter;
  detecting that the total current of the multistage power converter is at or below an upper reliability threshold;
  setting the reference voltage to a target operating voltage when the total current is at or below the upper reliability threshold;
  detecting that the total current of the multistage power converter rises above the upper reliability threshold; and
  lowering the reference voltage from the target operating voltage to a lower operating voltage when the total current rises above the upper reliability threshold.

Clause 2. The method of any clause herein, wherein determining the total current of the multistage power converter further includes:
  filtering an unfiltered current signal with a low-pass filter to generate a filtered current signal indicating the total current of the multistage power converter,
  wherein the unfiltered current signal is a combination of current monitoring signals generated by each stage of the multistage power converter.

Clause 3. The method of any clause herein, wherein lowering the reference voltage from the target operating voltage to the lower operating voltage further includes:
  decreasing the reference voltage at a voltage slope until the reference voltage is at the lower operating voltage.

Clause 4. The method of any clause herein, further comprising:
  detecting that the total current of the multistage power converter falls below the upper reliability threshold; and
  increasing the reference voltage from the lower operating voltage to the target operating voltage when the total current of the multistage power converter falls below the upper reliability threshold.

Clause 5. The method of any clause herein, wherein the voltage slope is a first voltage slope, and wherein increasing the reference voltage from the lower operating voltage to the target operating voltage further includes increasing the reference voltage at a second voltage slope until the reference voltage is at the target operating voltage.

Clause 6. The method of any clause herein, wherein the second voltage slope is less than the first voltage slope.

Clause 7. The method of any clause herein, further comprising:
  detecting that the output voltage is at or below a lower operating threshold; and
  disabling a current limit on each stage of the multistage power converter when the output voltage is at or below the lower operating threshold.

Clause 8. A controller for operating a multistage power converter, the controller comprising:

a multistage regulator configured to generate a plurality of control signals to drive the multistage power converter to produce an output voltage based on a reference voltage, and a voltage controller configured to:
  generate a set voltage,
  determine a total current of the multistage power converter,
  compare the total current of the multistage power converter to an upper reliability threshold,
  set the set voltage to a target operating voltage when the total current of the multistage power converter is at or below the upper reliability threshold, and
  set the set voltage to a lower operating voltage when the total current of the multistage power converter is above the upper reliability threshold,
  wherein the multistage regulator is further configured to adjust the reference voltage to match the set voltage.

Clause 9. The controller of any clause herein, further comprising a low-pass filter configured to filter an unfiltered current signal to generate a filtered current signal indicating the total current of the multistage power converter, wherein the unfiltered current signal is a combination of current monitoring signals generated by each stage of the multistage power converter.

Clause 10. The controller of any clause herein, wherein the voltage controller is further configured to generate a voltage slope, and wherein, to adjust the reference voltage to match the set voltage, the multistage regulator is further configured to increase or decrease the reference voltage at the voltage slope.

Clause 11. The controller of any clause herein, wherein the voltage controller is further configured to:
  set the voltage slope to a first value when the reference voltage is below the target operating voltage, and
  set the voltage slope to a second value when the reference voltage is at or above the target operating voltage.

Clause 12. The controller of any clause herein, wherein the second value is less than the first value.

Clause 13. The controller of any clause herein, wherein the multistage regulator is further configured to implement a current limit on each stage of the multistage power converter, and wherein the voltage controller is further configured to:
  compare the output voltage to a lower operating threshold, and
  disable the current limit on each stage of the multistage power converter when the output voltage is at or below the lower operating threshold.

Clause 14. A system for power conversion, the system comprising:
  a multistage power converter including a plurality of stages; and
  a controller configured to:
    generate a plurality of control signals to drive the plurality of stages to produce an output voltage based on a reference voltage,
    determine a total current of the multistage power converter,
    compare the total current of the multistage power converter to an upper reliability threshold,
    set the reference voltage to a target operating voltage when the total current of the multistage power converter is at or below the upper reliability threshold, and
    set the reference voltage to a lower operating voltage when the total current of the multistage power converter is above the upper reliability threshold.

Clause 15. The system of any clause herein, wherein, to determine the total current of the multistage power converter, the controller is further configured to filter an unfiltered current signal with a low-pass filter to generate a filtered current signal indicating the total current of the multistage power converter, wherein the unfiltered current signal is a combination of current monitoring signals generated by each stage of the multistage power converter.

Clause 16. The system of any clause herein, wherein, to set the reference voltage to the lower operating voltage, the controller is further configured to decrease the reference voltage from the target operating voltage to the lower operating voltage at a voltage slope.

Clause 17. The system of any clause herein, wherein, to set the reference voltage to the target operating voltage, the controller is further configured to increase the reference voltage from the lower operating voltage to the target operating voltage at a voltage slope.

Clause 18. The system of any clause herein, wherein, to set the reference voltage to the lower operating voltage, the controller is further configured to decrease the reference voltage at a first voltage slope until the reference voltage is at the lower operating voltage, and wherein, to set the reference voltage to the target operating voltage, the controller is further configured to increase the reference voltage at a second voltage slope until the reference voltage is at the target operating voltage.

Clause 19. The system of any clause herein, wherein the second voltage slope is less than the first voltage slope.

Clause 20. The system of any clause herein, wherein the controller is further configured to:
  implement a current limit on each of the plurality of stages,
  compare the output voltage to a lower operating threshold, and
  disable the current limit on each of the plurality of stages when the output voltage is at or below the lower operating threshold.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. A method for operating a multistage power converter, the method comprising:
  generating a plurality of control signals to drive the multistage power converter to produce an output voltage based on a reference voltage;
  determining a total current of the multistage power converter;
  detecting that the total current of the multistage power converter is at or below an upper reliability threshold;

setting the reference voltage to a target operating voltage when the total current is at or below the upper reliability threshold;

detecting that the total current of the multistage power converter rises above the upper reliability threshold; and lowering the reference voltage from the target operating voltage to a lower operating voltage when the total current rises above the upper reliability threshold.

2. The method of claim 1, wherein determining the total current of the multistage power converter further includes:

filtering an unfiltered current signal with a low-pass filter to generate a filtered current signal indicating the total current of the multistage power converter, wherein the unfiltered current signal is a combination of current monitoring signals generated by each stage of the multistage power converter.

3. The method of claim 1, wherein lowering the reference voltage from the target operating voltage to the lower operating voltage further includes:

decreasing the reference voltage at a voltage slope until the reference voltage is at the lower operating voltage.

4. The method of claim 3, further comprising:

detecting that the total current of the multistage power converter falls below the upper reliability threshold; and increasing the reference voltage from the lower operating voltage to the target operating voltage when the total current of the multistage power converter falls below the upper reliability threshold.

5. The method of claim 4, wherein the voltage slope is a first voltage slope, and wherein increasing the reference voltage from the lower operating voltage to the target operating voltage further includes increasing the reference voltage at a second voltage slope until the reference voltage is at the target operating voltage.

6. The method of claim 5, wherein the second voltage slope is less than the first voltage slope.

7. The method of claim 1, further comprising:

detecting that the output voltage is at or below a lower operating threshold; and disabling a current limit on each stage of the multistage power converter when the output voltage is at or below the lower operating threshold.

8. A controller for operating a multistage power converter, the controller comprising:

a multistage regulator configured to generate a plurality of control signals to drive the multistage power converter to produce an output voltage based on a reference voltage, and a voltage controller configured to:
generate a set voltage,
determine a total current of the multistage power converter,
compare the total current of the multistage power converter to an upper reliability threshold,
set the set voltage to a target operating voltage when the total current of the multistage power converter is at or below the upper reliability threshold, and
set the set voltage to a lower operating voltage when the total current of the multistage power converter is above the upper reliability threshold,
wherein the multistage regulator is further configured to adjust the reference voltage to match the set voltage.

9. The controller of claim 8, further comprising a low-pass filter configured to filter an unfiltered current signal to generate a filtered current signal indicating the total current of the multistage power converter, wherein the unfiltered current signal is a combination of current monitoring signals generated by each stage of the multistage power converter.

10. The controller of claim 8, wherein the voltage controller is further configured to generate a voltage slope, and wherein, to adjust the reference voltage to match the set voltage, the multistage regulator is further configured to increase or decrease the reference voltage at the voltage slope.

11. The controller of claim 10, wherein the voltage controller is further configured to:

set the voltage slope to a first value when the reference voltage is below the target operating voltage, and set the voltage slope to a second value when the reference voltage is at or above the target operating voltage.

12. The controller of claim 11, wherein the second value is less than the first value.

13. The controller of claim 8, wherein the multistage regulator is further configured to implement a current limit on each stage of the multistage power converter, and wherein the voltage controller is further configured to:

compare the output voltage to a lower operating threshold, and disable the current limit on each stage of the multistage power converter when the output voltage is at or below the lower operating threshold.

14. A system for power conversion, the system comprising:

a multistage power converter including a plurality of stages; and a controller configured to:
generate a plurality of control signals to drive the plurality of stages to produce an output voltage based on a reference voltage,
determine a total current of the multistage power converter,
compare the total current of the multistage power converter to an upper reliability threshold,
set the reference voltage to a target operating voltage when the total current of the multistage power converter is at or below the upper reliability threshold, and
set the reference voltage to a lower operating voltage when the total current of the multistage power converter is above the upper reliability threshold.

15. The system of claim 14, wherein, to determine the total current of the multistage power converter, the controller is further configured to filter an unfiltered current signal with a low-pass filter to generate a filtered current signal indicating the total current of the multistage power converter, wherein the unfiltered current signal is a combination of current monitoring signals generated by each stage of the multistage power converter.

16. The system of claim 14, wherein, to set the reference voltage to the lower operating voltage, the controller is further configured to decrease the reference voltage from the target operating voltage to the lower operating voltage at a voltage slope.

17. The system of claim 14, wherein, to set the reference voltage to the target operating voltage, the controller is further configured to increase the reference voltage from the lower operating voltage to the target operating voltage at a voltage slope.

18. The system of claim 14, wherein, to set the reference voltage to the lower operating voltage, the controller is further configured to decrease the reference voltage at a first voltage slope until the reference voltage is at the lower operating voltage, and wherein, to set the reference voltage to the target operating voltage, the controller is further configured to increase the reference voltage at a second voltage slope until the reference voltage is at the target operating voltage.

19. The system of claim 18, wherein the second voltage slope is less than the first voltage slope.

20. The system of claim 14, wherein the controller is further configured to:
- implement a current limit on each of the plurality of stages,
- compare the output voltage to a lower operating threshold, and
- disable the current limit on each of the plurality of stages when the output voltage is at or below the lower operating threshold.

* * * * *